United States Patent
Yang et al.

(10) Patent No.: US 7,561,630 B2
(45) Date of Patent: Jul. 14, 2009

(54) TRANSMISSION PARAMETER RECOGNITION APPARATUS AND METHOD THEREOF

(75) Inventors: Fang-Ming Yang, Tainan (TW); Ching-Piao Hung, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 0 days.

(21) Appl. No.: 11/855,154

(22) Filed: Sep. 14, 2007

(65) Prior Publication Data

US 2008/0069154 A1    Mar. 20, 2008

(30) Foreign Application Priority Data

Sep. 14, 2006    (TW) .............................. 95133982 A (51) Int. Cl.
H04L 27/28    (2006.01)
(52) U.S. Cl. ....................... 375/260; 375/343
(58) Field of Classification Search ................ 375/260, 375/340, 343; 455/59; 370/320, 335, 342, 370/441, 479, 515; 708/300–323, 422–426, 708/813–819
See application file for complete search history.

(56) References Cited

U.S. PATENT DOCUMENTS

| | | | |
|---|---|---|---|
| 6,993,083 B1 * | 1/2006 | Shirakata et al. | 375/260 |
| 7,319,659 B2 * | 1/2008 | Tsuie | 370/203 |
| 2002/0186791 A1 | 12/2002 | Foxcroft et al. | |
| 2004/0213194 A1 * | 10/2004 | Tsuie | 370/342 |
| 2004/0223449 A1 | 11/2004 | Tsuie et al. | |
| 2004/0240379 A1 | 12/2004 | Tsuie | |
| 2005/0265488 A1 * | 12/2005 | Jung | 375/340 |
| 2006/0039491 A1 * | 2/2006 | Han | 375/260 |
| 2006/0146947 A1 * | 7/2006 | Kim | 375/260 |

* cited by examiner

*Primary Examiner*—Shuwang Liu
*Assistant Examiner*—David Huang
(74) *Attorney, Agent, or Firm*—Jianq Chyun IP Office (57) ABSTRACT

A transmission parameter recognition apparatus and the method thereof are disclosed. The transmission parameter recognition apparatus includes a correlation function processing module, a correlation symbol summing module and an energy interval detection module. The correlation function processing module computes a correction between two adjoining symbols in a sample sequence to generate a correlation function sequence. The correlation symbol summing module accumulates M symbols in the correlation function sequence to generate an energy interval. Since the distribution of the energy interval is related to the guard interval type, therefore, the energy interval detection module detects the distribution of the energy interval to generate a piece of guard interval information.

18 Claims, 8 Drawing Sheets

TRANSMISSION PARAMETER RECOGNITION APPARATUS AND METHOD THEREOF

CROSS-REFERENCE TO RELATED APPLICATION

This application claims the priority benefit of Taiwan application serial no. 95133982, filed Sep. 14, 2006. All disclosure of the Taiwan application is incorporated herein by reference.

BACKGROUND OF THE INVENTION

1. Field of the Invention

The present invention generally relates to a transmission parameter recognition apparatus, and more particular, to a transmission parameter recognition apparatus for recognizing the guard interval type and the transmission mode.

2. Description of Related Art

In the digital communication field, every symbol transmitted by an orthogonal frequency division multiplexing system (OFDM system) includes a data interval and a guard interval. A transmission terminal can transmit data intervals in different lengths according to different transmission modes, and each transmission mode can select a guard interval with an appropriate length to avoid an inter-symbol interference (ISI) caused by the so-called multi-path effect (MPE) according to the practical need. Usually, the OFDM system applied in a digital video broadcasting-terrestrial system (DVB-T system) includes two kinds of transmission modes, "2K" mode and "8K" mode, wherein the guard interval lengths in each transmission mode include different fractions of a data interval length, namely $\frac{1}{4}$, $\frac{1}{8}$, $\frac{1}{16}$ or $\frac{1}{32}$ data interval length.

Figure 1:
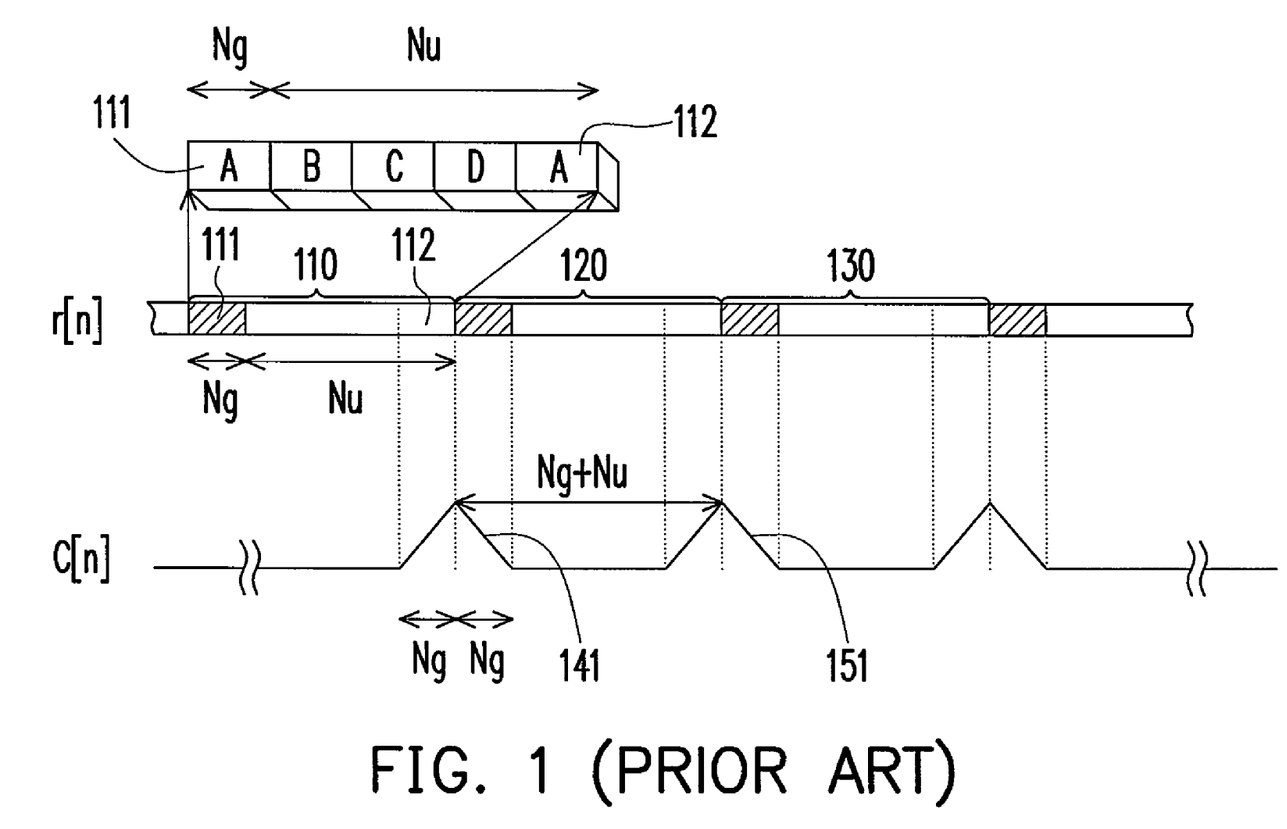
FIG. 1 is a diagram of a conventional correlation function processing module.

Due to an OFDM signal in various transmission modes, the reception terminal must first detect the transmission mode and the guard interval type of the received symbols, so as to extract the correct data intervals. FIG. 1 is a diagram of a conventional correlation function processing module, employed by a conventional OFDM system for detecting the transmission mode and the guard interval type. As shown by FIG. 1, r[n] herein represents a sample sequence of an OFDM signal after analog-to-digital converting (ADC), which includes a plurality of symbols, for example, symbols 110, 120 and 130, and each of the symbols comprises a guard interval in a length of Ng (namely, Ng sample points) and a data interval in a length of Nu (namely, Nu sample points).

Since every symbol contains a repeating structure therein (for example, the guard interval 111 is a replica of the end portion 112 of the symbol 110), thus, the conventional function processor generates a conjugate product sequence according to the relation between two adjacent symbols and accumulates these values corresponding to all the sample points in the conjugate product sequence over the summing length Ng to generate a correlation function sequence, which includes a plurality of triangle-like waveforms, for example, 141 and 151, and the relation between the triangle-like waveforms implies the transmission mode information and guard interval type information.

Figure 2A:
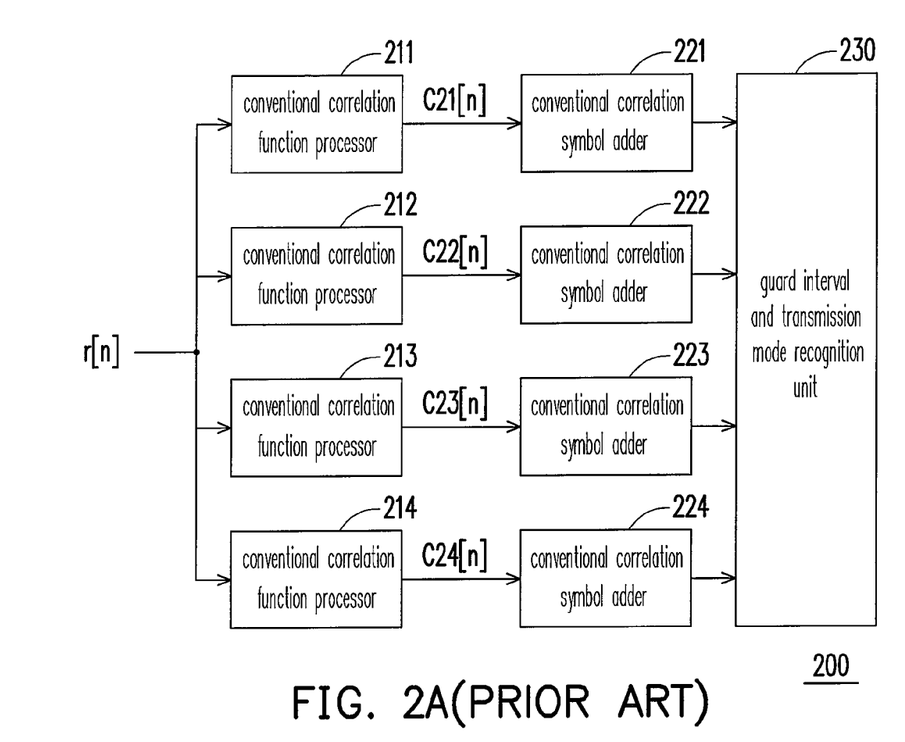
FIG. 2A is an architecture diagram of a conventional transmission parameter recognition apparatus.

The OFDM signal used in a DVB-T system includes two transmission modes (Nu=2048 and Nu=8192) and four guard interval types (($\frac{1}{4}$)Nu, ($\frac{1}{8}$)Nu, ($\frac{1}{16}$)Nu and ($\frac{1}{32}$)Nu). To extract the correct information, a conventional transmission parameter recognition apparatus, as shown in FIG. 2A, an architecture diagram of a conventional transmission parameter recognition apparatus, employs a set comprising four conventional correlation function processors 211-214 and a set comprising four conventional correlation symbol adders 221-224 to detect the implied transmission mode and guard interval type, wherein the summing length of the conventional correlation function processors 211-214 is respectively ($\frac{1}{32}$)Nu, ($\frac{1}{16}$)Nu, ($\frac{1}{8}$)Nu and ($\frac{1}{4}$)Nu; while the conventional correlation symbol adders 221-224 respectively provide (Nu+($\frac{1}{32}$)Nu) sample memory points, (Nu+($\frac{1}{16}$)Nu) sample memory points, (Nu+($\frac{1}{8}$)Nu) sample memory points and (Nu+($\frac{1}{4}$)Nu) sample memory points.

Figure 2B:
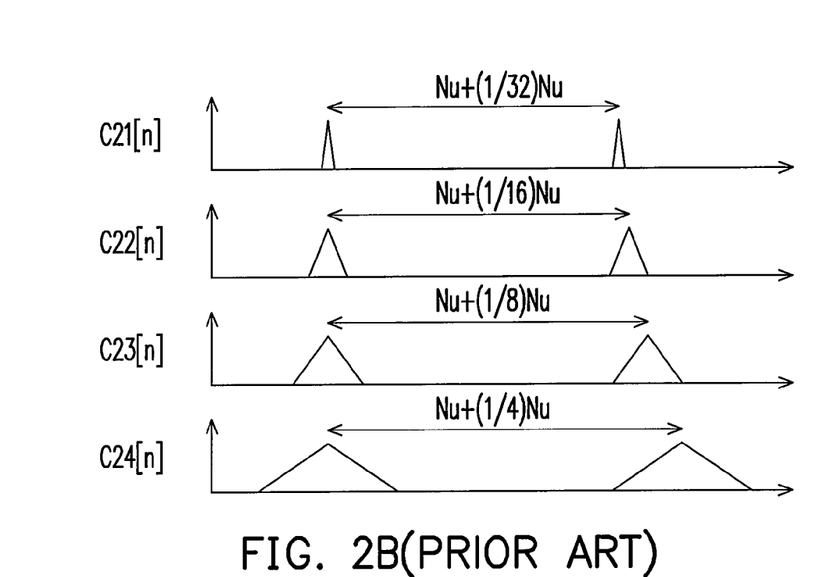
FIG. 2B is a signal timing diagram for the architecture in FIG. 2A.

Continuing to FIG. 2B, when the guard interval length of a sample sequence r[n] is respectively ($\frac{1}{32}$)Nu, ($\frac{1}{16}$)Nu, ($\frac{1}{8}$)Nu and ($\frac{1}{4}$)Nu, the sample sequence r[n] would respectively pass through the conventional correlation function processors 211-214 to output correlation function sequences C21[n]-C24[n], as shown by FIG. 2B. Then, the correlation function sequences C21[n]-C24[n] are respectively fed into the conventional correlation symbol adders 221-224 with different sample memory points for superposing the triangle-like waveforms in the correlation function sequences. After the superposing, the peaks of the triangle-like waveforms are more distinct, so that the guard interval and transmission mode recognition unit 230 is able to detect the plurality of peaks produced by the conventional correlation symbol adders 221-224 and to obtain the transmission mode and the guard interval type of the OFDM signal.

Figure 3A:
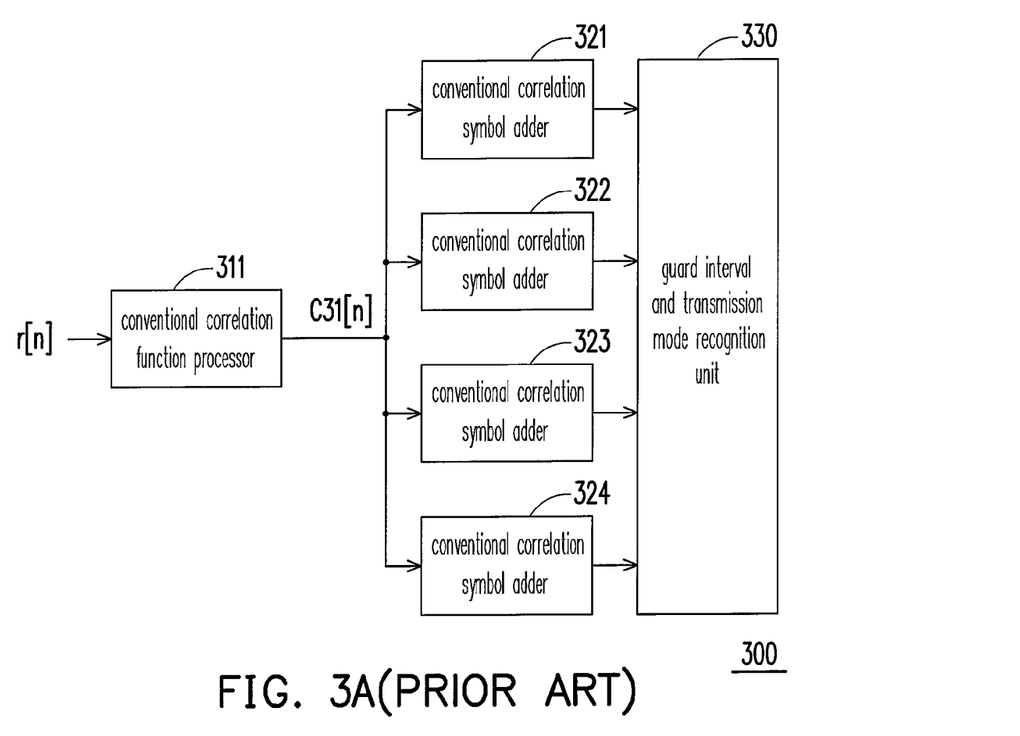
FIG. 3A is an architecture diagram of another conventional transmission parameter recognition apparatus.

In order to simplify the hardware architecture of the conventional transmission parameter recognition apparatus 200, another conventional transmission parameter recognition apparatus as shown by FIG. 3A is provided. Referring to FIG. 3A, a conventional transmission parameter recognition apparatus 300 employs a conventional correlation function processor 311 and four conventional correlation symbol adders 321-324 to detect the transmission mode and the guard interval type, wherein the summing length of the conventional correlation function processor 311 is ($\frac{1}{32}$)Nu, while the conventional correlation symbol adders 321-324 respectively provide (Nu+($\frac{1}{32}$)Nu) sample memory points, (Nu+($\frac{1}{16}$)Nu) sample memory points, (Nu+($\frac{1}{8}$)Nu) sample memory points and (Nu+($\frac{1}{4}$)Nu) sample memory points.

Figure 3B:
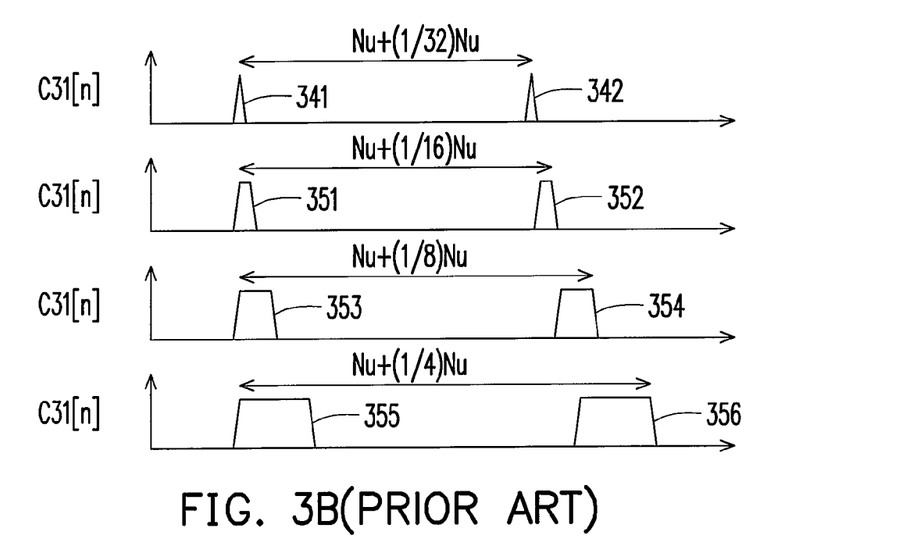
FIG. 3B is a signal timing diagram for the architecture in FIG. 3A.

Continuing to FIG. 3B, when the guard interval length of a sample sequence r[n] is respectively ($\frac{1}{32}$)Nu,($\frac{1}{16}$)Nu,($\frac{1}{8}$)Nu and ($\frac{1}{4}$)Nu, after the sample sequence r[n] passes through the conventional correlation function processor 311, different correlation function sequences C31[n] are generated, wherein each of the correlation function sequences C31[n] respectively has a plurality of different triangle-like waveforms (for example, 341 and 342) or different trapezoid-like waveforms (for example, 351-356) in response to the different guard interval lengths. The transmission mode and guard interval information can be recognized from the triangle-like waveforms or trapezoid-like waveforms.

Therefore, the correlation function sequence C31[n] is passed through the conventional correlation symbol adders 321-324 with different sample memory points to superpose the triangle-like waveforms or the trapezoid-like waveforms thereof, so that a guard interval and transmission mode recognition unit 330 is able to obtain the transmission mode information and the guard interval information of the OFDM signal by judging the repeated periods of the triangle-like waveforms or the trapezoid-like waveforms or by judging the amount of energy contained in the triangle-like waveforms or the trapezoid-like waveforms possess.

The US patent published application No. 20020186791, for example, discloses a recognition apparatus having a hardware architecture similar to the above-mentioned conventional transmission parameter recognition apparatus 300, wherein the transmission mode information and the guard interval information of an OFDM signal are obtained by judging the periodic property of the occurred triangle-like waveforms or the trapezoid-like waveforms. The US patent published applications No. 20030219804, No. 20040223449 and No. 20040240379 also adopt a hardware architecture similar to the conventional transmission parameter recognition apparatus 300, wherein the transmission mode information and the guard interval information of the OFDM signal are obtained by judging the amount of energy contained in the triangle-like waveforms or the trapezoid-like waveforms.

Although the conventional transmission parameter recognition apparatus 300 tries to lower the quantity of the employed conventional correlation function processors for simplifying the adopted hardware architecture, however, the conventional transmission parameter recognition apparatus 300 still requires a plurality of conventional correlation symbol adders in coordination with the multiple guard interval types. In other words, the conventional transmission parameter recognition apparatus 300, limited by using a plurality of conventional correlation symbol adders, can not effectively reduce the hardware architecture complexity and lower the power consumption in practice.

SUMMARY OF THE INVENTION

Accordingly, the present invention is directed to provide a transmission parameter recognition apparatus capable of reducing the complexity and power consumption thereof by using a correlation symbol summing module to generate an energy interval impliedly containing the transmission mode information and the guard interval information.

The present invention is also directed to provide a transmission parameter recognition method capable of effectively reducing the complexity and power consumption of the hardware architecture by detecting an energy interval of the correlation symbol sum sequence.

To achieve the above-mentioned or other objectives, the present invention provides a transmission parameter recognition apparatus for detecting a sample sequence and outputting a piece of guard interval information according to the detection result, wherein the sample sequence includes a plurality of symbols and each of the symbols includes a guard interval and a data interval. The transmission parameter recognition apparatus includes a correlation function processing module, a correlation symbol sum sequence and an energy interval detection module.

The correlation function processing module is used for performing a conjugating and multiplying calculation on two adjacent symbols from the sample sequence to generate a conjugate product sequence, and accumulating these values corresponding to a sample point and MNg sample points in the conjugate product sequence to generate a value of a correlation sample point, wherein the MNg sample points are prior to the sample point, a plurality of the correlation sample points form a correlation symbol, a plurality of the correlation symbols form a correlation function sequence and MNg is the least length of the guard interval corresponding to a testing mode.

The correlation symbol summing module is used for providing the first sample memory point to the (MNk+MNu)-th sample memory point, and using the sample memory points for sequentially reading and summing up the values corresponding to the correlation sample points in M correlation symbols of the plurality of the correlation symbols to generate a correlation symbol sum sequence, wherein the i-th sample memory point is adopted for reading and summing up a value of the [N*(MNk+MNu)+i]-th correlation sample point, MNu is the data interval length in the testing mode, MNk is equal to MNg plus a predetermined value, M is a integer, $0 \leq N \leq M$ and $1 \leq i \leq (MNk+MNu)$.

The energy interval detection module is used for detecting an energy interval in the correlation symbol sum sequence and generating a piece of guard interval information according to the energy interval, wherein the guard interval information includes a ratio of guard interval length to data interval length.

In the preferred embodiment of the invention, the transmission parameter recognition apparatus includes a plurality of testing modes, and the sample sequence passes through the correlation function processing module and the correlation symbol summing module of the testing modes, so that the energy interval detection module is able to generate a plurality of mode energy information respectively. The transmission parameter recognition apparatus further includes a transmission mode recognition apparatus for judging the plurality of mode energy information to output a piece of transmission mode information, wherein the transmission mode information is adopted for obtaining the transmission mode of the sample sequence.

In the preferred embodiment of the invention, the above-mentioned energy interval detection module includes a rising-edge detector, an energy accumulator and a guard interval recognition apparatus. The rising-edge detector is used for detecting the rising-edge of an energy interval to output a first time point. The energy accumulator takes the first time point as the initiative point and a plurality of time points as a summation end point to calculate and accumulate the values of the energy interval, and generates a plurality of mode energy information according to the accumulation results. The guard interval recognition apparatus is used for judging the plurality of mode energy information to generate a guard interval information.

On the other hand, the present invention provides a transmission parameter recognition method, which includes receiving a sample sequence, wherein a sample sequence includes a plurality of symbols and each symbol includes a guard interval and a data interval; performing a conjugating, delaying and multiplying calculation on two adjacent symbols from the sample sequence to generate a conjugated product sequence, and accumulating these values corresponding to a sample point and MNg sample points in the conjugate product sequence so as to generate a value of a correlation sample point, wherein the MNg sample points are prior to the sample point, a plurality of the correlation sample points form a correlation symbol, a plurality of the correlation symbols form a correlation function sequence and MNg is the least length of the guard interval corresponding to a testing mode.

In order to generate the information impliedly containing the guard interval type, the transmission parameter recognition method provides the first sample memory point to the (MNk+MNu)-th sample memory point, and uses these sample memory points for sequentially reading and summing the values of the corresponding correlation sample points in the M correlation symbols of the plurality of the correlation symbols to generate a correlation symbol sum sequence, wherein the i-th sample memory point is for reading and summing the values of the above-mentioned [N*(MNk+MNu)+i]-th correlation sample points in the M correlation symbols, MNu is the data interval length in the testing mode, MNk is equal to MNg plus a predetermined value, M is a integer, $0 \leq N \leq M$, $1 \leq i \leq (MNk+MNu)$. After that, the transmission parameter recognition method detects an energy interval in the correlation symbol sum sequence and uses the distribution of the energy interval to generate a guard interval information, wherein the guard interval information includes a ratio of guard interval length to data interval length.

In the preferred embodiment of the invention, the transmission parameter recognition method includes a plurality of testing modes. The transmission parameter recognition method further includes: selecting one of the testing modes to generate a piece of mode energy information corresponding to the selected testing mode according to the guard interval information; judging whether all the testing modes have been selected one by one, wherein if not all testing modes are selected, one is selected from the testing modes unselected and if all the testing modes have been selected one by one, the plurality of mode energy information is judged to generate a piece of transmission mode information for obtaining the transmission mode of the sample sequence.

In the preferred embodiment of the invention, the abovementioned step for generating the guard interval formation based on the energy interval distribution includes: detecting the rising-edge of an energy interval to output a first time point; taking the first time point as the initiative point and a plurality of time points as a terminal point to accumulate the values of the energy interval, and generating a plurality of mode energy information according to the accumulation result; and judging the plurality of mode energy information to generate a piece of guard interval information.

By using a correlation symbol summing module to generate an energy interval, the present invention enables the energy interval detection module thereof to reveal the energy interval distribution, followed by obtaining the guard interval type of the sample sequence, so as to achieve the goal of simplifying the hardware architecture complexity and lowering the power consumption.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The primary technical feature of the present invention resides in utilizing an energy interval generated by the correlation symbol summing module to judge various guard interval types. Compared to the prior art, the transmission parameter recognition apparatus of the present invention is capable of reducing the complexity of the hardware architecture thereof and the power consumption. Furthermore, the present invention also realizes miniaturization and portability for the receiver employing the transmission parameter recognition apparatus.

Figure 4:
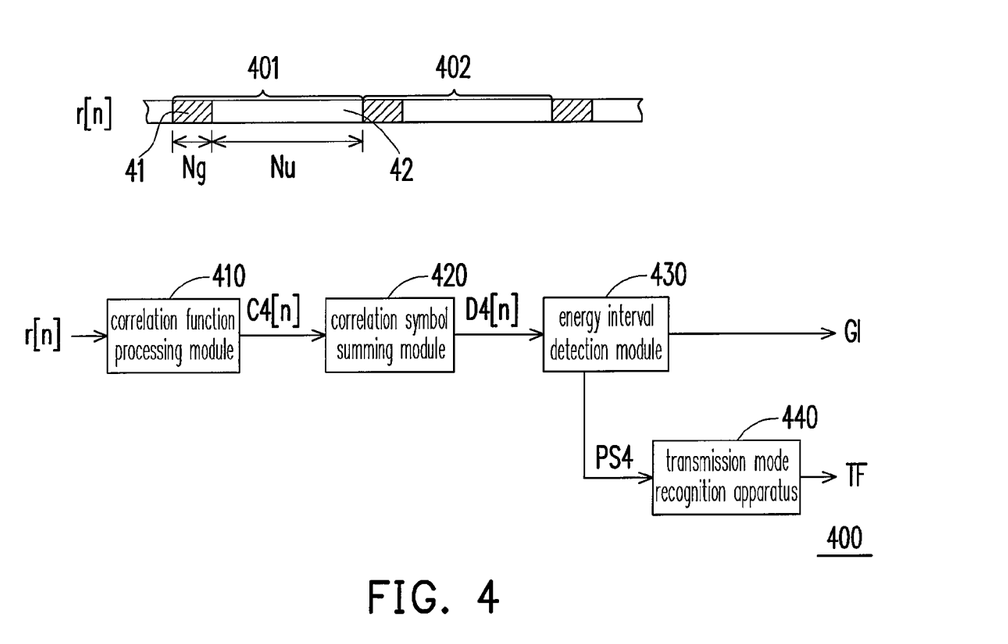
FIG. 4 is an architecture diagram of a transmission parameter recognition apparatus according to a preferred embodiment of the present invention.

FIG. 4 is an architecture diagram of a transmission parameter recognition apparatus according to a preferred embodiment of the present invention. Referring to FIG. 4, a transmission parameter recognition apparatus 400 includes a correlation function processing module 410, a correlation symbol summing module 420 and an energy interval detection module 430, wherein the correlation symbol summing module 420 is coupled to the correlation function processing module 410 and the energy interval detection module 430 is coupled to the correlation symbol summing module 420.

The transmission parameter recognition apparatus 400 is used for detecting a sample sequence r[n] and outputting a piece of guard interval information GI, wherein the sample sequence r[n] includes a plurality of symbols, for example, symbols 401 and 402, and each symbol includes a guard interval and a data interval. For example, the symbol 401 includes a guard interval 41 and a data interval 42, wherein the length of the guard interval is indicated by Ng (namely, the guard interval has Ng sample points), while the length of the data interval is indicated by Nu (namely, the data interval has Nu sample points).

The lengths of a guard interval and a data interval in a sample sequence r[n] are various to adapt the different application fields. For example, for the DVB-T system, the sample sequence r[n] includes two kinds of transmission modes ("2K" mode and "8K" mode) and four guard interval types (($1/4$)Nu, ($1/8$)Nu, ($1/16$)Nu and ($1/32$)Nu). For the "2K" mode, the data interval length Nu has 2048 sample points, while for the "8K" mode, the data interval length Nu has 8192 sample points. Each of the transmission modes includes four guard interval types. Thus, the transmission parameter recognition apparatus 400 must detect out what the transmission mode and what the guard interval type the received sample sequence r[n] uses so as to reveal the guard interval length Ng and the data interval length Nu.

For illustration purpose, the transmission parameter recognition apparatus 400 used in a DVB-T system is exemplarily described hereinafter. Assuming the transmission parameter recognition apparatus 400 has identified the transmission mode of the sample sequence r[n] is "2K" mode, the transmission parameter recognition apparatus 400 would take "2K" mode as the testing mode at the point. The correlation function processing module 410 therewith performs a conjugating and multiplying calculation on two adjacent symbols from the sample sequence r[n] to generate a conjugate product sequence, and accumulates these values corresponding to a sample point and MNg sample points in the conjugate product sequence to generate a value of a correlation sample point, wherein the MNg sample points are prior to the sample point, a plurality of the correlation sample points form a correlation symbol, a plurality of the correlation symbols form a correlation function sequence C4[n] and MNg is the least length of the guard interval in the a testing mode.

Figure 5:
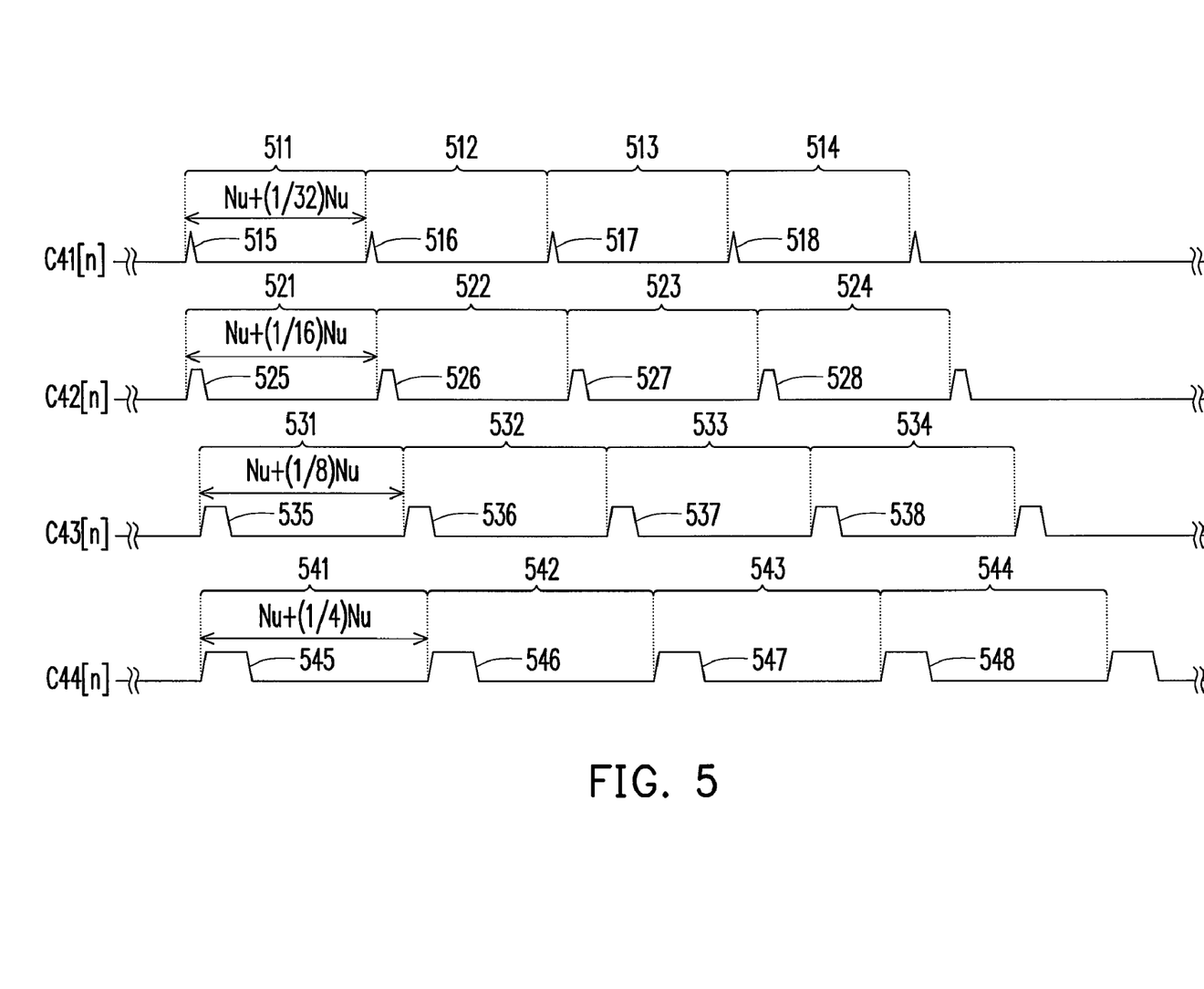
FIG. 5 is a signal timing diagram for the architecture in FIG. 4.

FIG. 5 is a signal timing diagram for the architecture in FIG. 4. Referring to FIGS. 4 and 5, since the sample sequence r[n] takes "2K" transmission mode and the testing mode of the transmission parameter recognition apparatus 400 is set as "2K" testing mode at the point, thus, the Nu of the sample sequence r[n] is 2048 sample points and MNg is set as 64 sample points (namely, (1/32)Nu) by the correlation function processing module 410.

When the guard interval length Ng of the sample sequence r[n] is (1/32)Nu, the correlation function sequence C4[n] generated by the correlation function processing module 410 is shown by the correlation function sequence C41[n] in FIG. 5, wherein the correlation function sequence C41[n] includes a plurality of correlation symbols, for example, 511-514, the length of each correlation symbol is (Nu+(1/32)Nu) and each correlation symbol includes a triangle-like waveform, for example, the correlation symbol 511 includes the triangle-like waveform 515.

When the guard interval length Ng of the sample sequence r[n] is (1/16)Nu, the correlation function sequence C4[n] generated by the correlation function processing module 410 is shown by the correlation function sequence C42[n] in FIG. 5, wherein the correlation function sequence C42[n] includes a plurality of correlation symbols, for example, 521-524, the length of each correlation symbol is (Nu+(1/16)Nu) and each correlation symbol includes a trapezoid-like waveform, for example, the correlation symbol 521 includes the trapezoid-like waveform 525.

Similarly, when the guard interval length Ng of the sample sequence r[n] is respectively (1/8)Nu and (1/4)Nu, the correlation function sequences C4[n] generated by the correlation function processing module 410 is respectively shown by the correlation function sequences C43[n] and C44[n] in FIG. 5, wherein the correlation function sequence C43[n] includes correlation symbols 531-534, each correlation symbol of 531-534 respectively includes one of trapezoid-like waveforms 535-538 and the length of each correlation symbol is (Nu+(1/8)Nu), while the correlation function sequence C44[n] includes correlation symbols 541-544, each correlation symbol of 541-544 includes one of trapezoid-like waveforms 545-548 and the length of each correlation symbol is (Nu+(1/4)Nu).

Note that the correlation symbol summing module 420 includes a rising-edge detector (not shown). Therefore, after the correlation function processing module 410 generates a correlation function sequence C4[n], the rising-edge detector in the correlation symbol summing module 420 would first detect the initiative point of the 1-st correlation symbol in the correlation function sequence C4[n]. Because the length of each correlation symbol in the correlation function sequence C4[n] is the same, the correlation symbol summing module 420 can recognize the initiative point of each correlation symbol by detecting the initiative point of the 1-st correlation symbol. Then, the correlation symbol summing module 420 provides the first sample memory point to the (MNk+MNu)-th sample memory point, and uses these sample memory points for sequentially reading and summing up the values corresponding to the correlation sample points in the M correlation symbols of the plurality of the correlation symbols to generate a correlation symbol sum sequence D4[n], wherein the i-th sample memory point is for reading and summing up the values corresponding to the above-mentioned [N*(MNk+MNu)+i]-th correlation sample point, MNu is the data interval length in the testing mode, MNk is equal to MNg plus a predetermined value, M is a integer, 0≦N≦M and 1≦i≦(MNk+MNu)).

Figure 6:
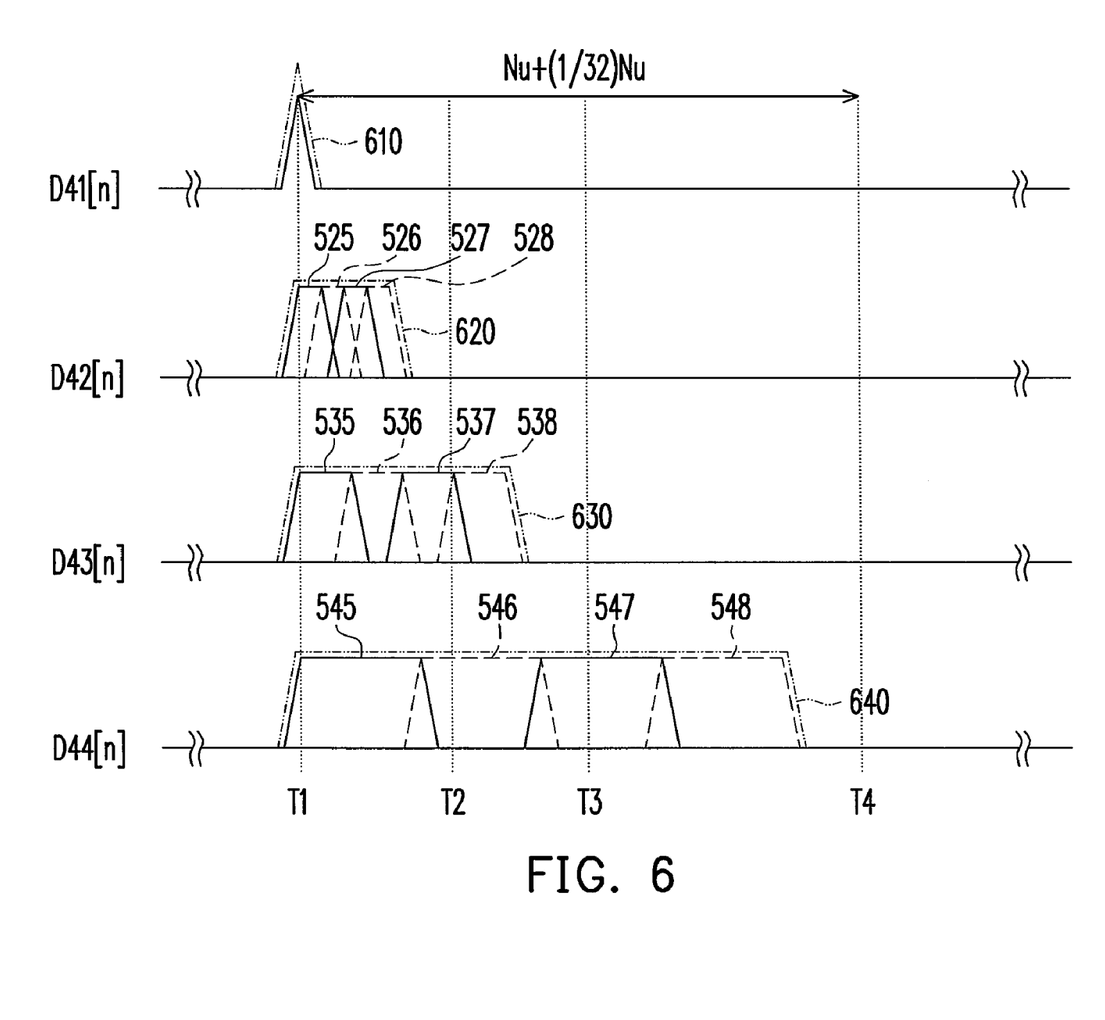
FIG. 6 is another signal timing diagram for the architecture in FIG. 4.

FIG. 6 is another signal timing diagram for the architecture in FIG. 4. Referring to FIGS. 4, 5 and 6, since the sample sequence r[n] takes "2K" transmission mode and the testing mode of the transmission parameter recognition apparatus 400 is set as "2K" testing mode at the point, thus, the MNu set by the correlation symbol summing module 420 is 2048 sample points (MNu=Nu at the point). For illustrating the embodiment of the present invention, it is assumed that M=4, the predetermined value is zero (namely, MNk=MNg=(1/32)Nu) and the correlation symbol summing module 420 provides the first sample memory point to the ((1/32)Nu+Nu)-th sample memory point.

When the guard interval length Ng of the sample sequence r[n] is (1/32)Nu, the correlation symbol summing module 420 accumulates these values corresponding to correlation sample points in the four correlation symbols (for example, the correlation symbols 511-514) of the correlation function sequence C41[n]. Since each correlation symbol length in the correlation function sequence C41[n] has ((1/32)Nu+Nu) correlation sample points, the correlation symbol summing module 420 also provides ((1/32)Nu+Nu) sample memory points to match the correlation symbol length.

Thus, the value of the first correlation sample point in the correlation symbol 511 and the value of the first correlation sample point in the correlation symbol 512 are read and summed by using the first sample memory point. In other words, the correlation symbol sum sequence D4[n] generated by the correlation symbol summing module 420 according to the correlation function sequence C41[n] is as shown by the correlation symbol sum sequence D41[n] in FIG. 6, the triangle-like waveforms 515-518 included by the correlation symbols 511-514 are summed up each other at the corresponding correlation sample points to form an energy interval 610.

When the guard interval length Ng of the sample sequence r[n] is (1/16)Nu, the correlation symbol summing module 420 accumulates these values corresponding to correlation sample points in the four correlation symbols (for example, the correlation symbols 521-524) of the correlation function sequence C42[n]. Since each correlation symbol length in the correlation function sequence C42[n] has ((1/16)Nu+Nu) correlation sample points, thus, the correlation symbol summing module 420 uses the first point to the ((1/32)Nu+Nu)-th point, to sequentially read in the values corresponding to the first correlation sample point to the ((1/32)Nu+Nu)-th correlation sample point. Then, the correlation symbol summing module 420 uses the first point to the ((1/32)Nu)-th point again, to sequentially read and sum up the values corresponding to the ((1/32)Nu+Nu+1)-th correlation sample point to the ((1/16)Nu+Nu)-th correlation sample point. After that, for adding the correlation symbol 522, the correlation symbol summing module 420 uses the sample memory points, starting from the ((1/16)Nu+1)-th point up, to sequentially read and sum up the values of the correlation sample points in the correlation symbol 522. Analogically for the rest, the correlation symbol sum sequence D4[n] generated by the correlation symbol summing module 420 according to the correlation function sequence C42[n] is as shown by the FIG. 6, where the trapezoid-like waveforms 525-528 respectively included by the four correlation symbols 521-524 are summed up to form an energy interval 620.

Similarly, when the guard interval length Ng of the sample sequence r[n] is (1/8)Nu and (1/4)Nu, respectively, the correlation symbol summing module 420 would respectively generate correlation symbol sum sequences D43[n] and D44[n] according to the correlation function sequences C43[n] and C44[n]. The correlation symbol sum sequence D43[n] includes an energy interval 630 formed by summing up the trapezoid-like waveforms 535-538, while the correlation symbol sum sequence D44[n] includes an energy interval 640 formed by summing up the trapezoid-like waveforms 545-548.

Continuing to FIGS. 4 and 6, it can be seen from FIG. 6 that a same sample sequence r[n] but having different guard interval types would generate different energy interval with a different energy distribution in the correlation symbol sum sequence D4[n]. Therefore, the energy interval detection module 430 detects the energy interval of the correlation symbol sum sequence D4[n] to obtain a piece of guard interval information GI according to the energy interval distribution, wherein the guard interval information GI includes a ratio of guard interval length Ng to data interval length Nu (for example, ¼, ⅛, 1/16 and 1/32). Since the transmission mode of the sample sequence r[n] is known (namely, the length Nu is known), therefore, once the guard interval information GI including one of the above-mentioned ratios is obtained, the guard interval length Ng of the sample sequence r[n] can be derived.

However, when the transmission parameter recognition apparatus 400 does not know the transmission mode of the sample sequence r[n] or the sample sequence r[n] adopts multiple transmission modes, the transmission parameter recognition apparatus 400 would set all the possible testing modes corresponding to all the transmission modes in sequence. For example, if the sample sequence r[n] includes "2K" mode and "8K" mode, the testing modes of the transmission parameter recognition apparatus 400 would include "2K" testing mode and "8K" testing mode.

To adapt the above-mentioned situations, the transmission parameter recognition apparatus 400 further includes a transmission mode recognition apparatus 440, which is coupled to the energy interval detection module 430 and for judging a plurality of mode energy information PS4 (described in detail hereinafter) to output a transmission mode information TF, wherein the transmission mode information TF is for obtaining the transmission mode of the sample sequence r[n].

For example, the transmission parameter recognition apparatus 400 would select the multiple testing modes (for example, "2K" mode and "8K" mode) in sequence, so that the sample sequence r[n] is passed through the correlation function processing module 410 and the correlation symbol summing module 420 in "2K" testing mode and the energy interval detection module 430 further generates a piece of corresponding mode energy information PS41 according to the guard interval information GI After that, the sample sequence r[n] is passed through the correlation function processing module 410 and the correlation symbol summing module 420 in "8K" testing mode and the energy interval detection module 430 generates another piece of corresponding mode energy information PS42 according to the guard interval information GI. In this way, the transmission mode recognition apparatus 440 is able to judge a plurality of mode energy information PS4 (i.e. the mode energy information PS41 and the mode energy information PS42) and output the transmission mode information TF therewith.

Figure 7:
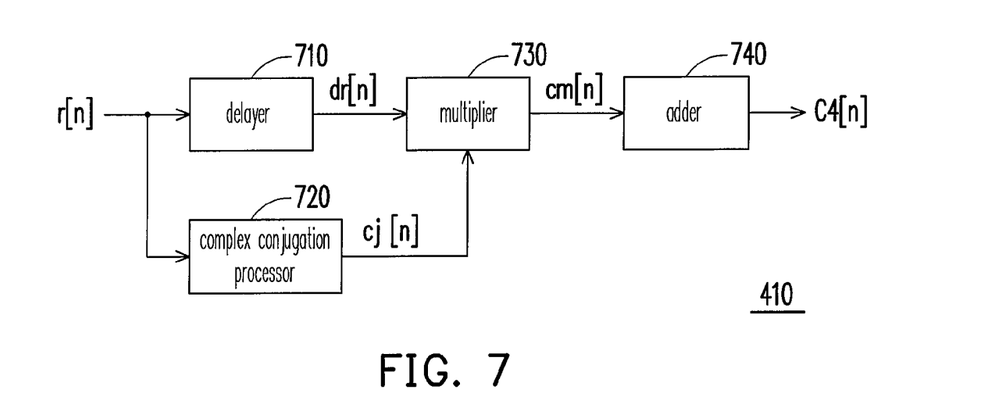
FIG. 7 is an architecture diagram of a correlation function processing module according to the preferred embodiment of the present invention.

FIG. 7 is an architecture diagram of a correlation function processing module according to the preferred embodiment of the present invention. Referring to FIG. 7, the correlation function processing module 410 includes a delayer 710, a complex conjugation processor 720, a multiplier 730 and an adder 740, wherein the multiplier 730 is coupled to the delayer 710 and the complex conjugation processor 720 and the adder 740 is coupled to the multiplier 730.

Continuing to FIG. 7, the delayer 710 is used for receiving the sample sequence r[n] and delaying the sample sequence r[n] with MNu sample points, followed by outputting the delayed sample sequence r[n] as a delayed sample sequence dr[n]. The complex conjugation processor 720 is used also for receiving the sample sequence r[n] and calculating a complex conjugate of the sample sequence r[n] to obtain a complex conjugated sample sequence cj[n]. The multiplier 730 is used for multiplying the delayed sample sequence dr[n] by the complex conjugated sample sequence cj[n] to generate a conjugate product sequence cm[n]. The adder 740 is used for accumulating these values corresponding to the sample point and MNg sample points in the conjugate product sequence cm[n] to generate the value of the correlation sample point, wherein these MNg sample points are prior to the sample point, a plurality of the correlation sample points form a correlation symbol and a plurality of the correlation symbols form a correlation function sequence C4[n].

Figure 8:
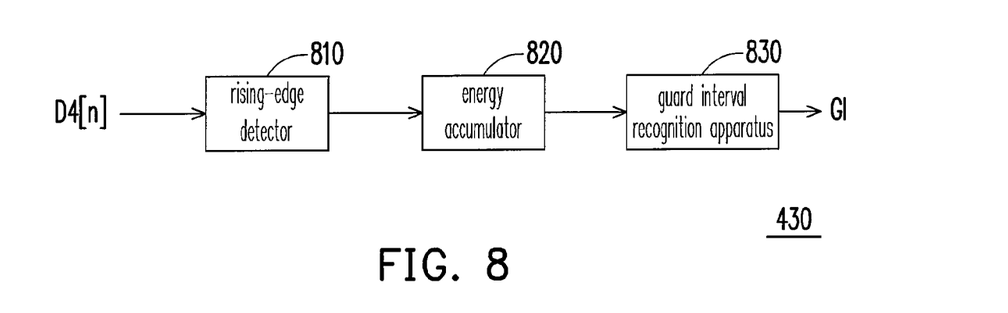
FIG. 8 is an architecture diagram of an energy interval detection module according to the preferred embodiment of the present invention.

FIG. 8 is an architecture diagram of an energy interval detection module according to the preferred embodiment of the present invention. Referring to FIG. 8, the energy interval detection module 430 includes a rising-edge detector 810, an energy accumulator 820 and a guard interval recognition apparatus 830, wherein the energy accumulator 820 is coupled to the rising-edge detector 810, while the guard interval recognition apparatus 830 is coupled to the energy accumulator 820.

Continuing to FIG. 8, the rising-edge detector 810 is used for detecting the rising-edge of an energy interval so as to output a first time point. The energy accumulator 820 takes the first time point as the initiative point in order to perform calculations and summations on the values of the energy interval over a plurality of time points so as to generate a plurality of mode energy information. Thus, the guard interval recognition apparatus 830 can generate a piece of guard interval information GI by judging the plurality of mode energy information.

Note that the above-mentioned first time point can be obtained according to the output from the rising-edge detector (not shown) in the correlation symbol summing module 420, therefore, one skilled in the art may configure the rising-edge detector 810 according to the practical need. In addition, the above-mentioned time points include the first time point and more, up to the i-th time point, wherein i is an integer greater than 1.

Continuing to FIG. 8, taking the energy interval shown by FIG. 6 as an example, a sample sequence r[n] passing through the transmission parameter recognition apparatus would generate different energy interval distributions in response to the different guard interval types. Thus, the rising-edge detector 810 would detect the rising-edge of the energy interval, and therewith generate the first time point T1. After that, the energy accumulator 820 takes the first time point T1 as the initiative point, respectively takes the time points T2, T3 and T4 as the summation end points to accumulate the values of the energy interval, and generates a plurality of mode energy information PW2-PW4 according to the accumulation results. The guard interval recognition apparatus 830 judges the mode energy information PW2-PW4 to generate the guard interval information GI, wherein as the guard interval length Ng of the sample sequence r[n] takes (¼)Nu, the value corresponding to the mode energy information PW4 is the maximum value. Similarly, as the guard interval length Ng of the sample sequence r[n] takes (⅛)Nu, the value corresponding to the mode energy information PW3 is the maximum value. It can be derived that as the guard interval length Ng of the sample sequence r[n] takes (1/32)Nu, the values corresponding to the mode energy information PW2, PW3 and PW4 are the same.

Figure 9:
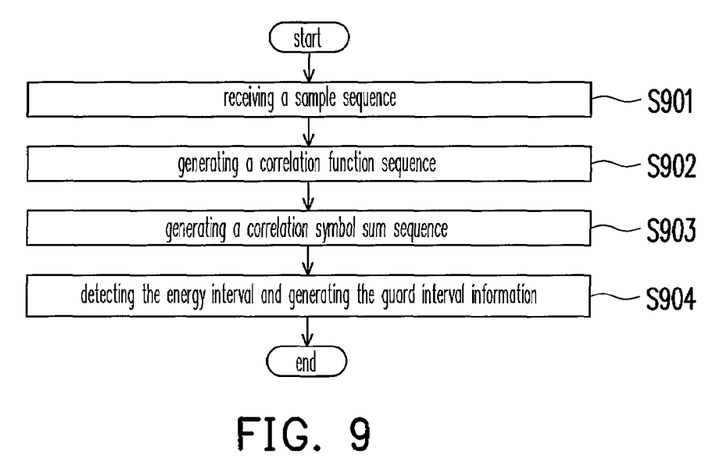
FIG. 9 is a flowchart of a transmission parameter recognition method according to a preferred embodiment of the present invention.

FIG. 9 is a flowchart of a transmission parameter recognition method according to a preferred embodiment of the present invention. The operation-flow of the embodiment is similar to the operation-flow of the transmission parameter recognition apparatus described in the above embodiment.

First, in step S901, a sample sequence is received, wherein the sample sequence includes a plurality of symbols and each symbol includes a guard interval and a data interval. Next, in step S902, performing a conjugating, delaying and multiplying calculation on two adjacent symbols from the sample sequence to generate a conjugated product sequence. Then, accumulating these values corresponding to a sample point and MNg sample points in the conjugate product sequence to generate a value of a correlation sample point, wherein the MNg sample points are prior to the sample point, a plurality of the correlation sample points form a correlation symbol, a plurality of the correlation symbols form a correlation function sequence and MNg is the least length of the guard interval in a testing mode.

In order to generate the information impliedly containing a energy interval type, in step 903, the first sample memory point to the (MNk+MNu)-th sample memory point, are provided. By using the sample memory points, the values corresponding to the correlation sample points in the M correlation symbols of the plurality of the correlation symbols are sequentially read and summed up to generate a correlation symbol sum sequence, wherein the i-th sample memory point is for reading and summing the values corresponding to the above-mentioned [N*(MNk+MNu)+i]-th correlation sample point, MNu is the data interval length corresponding in testing mode, MNk is equal to MNg plus a predetermined value, M is a integer, $0 \leq N \leq M$ and $1 \leq i \leq (MNk+MNu)$.

Furthermore, in step S904, an energy interval of the correlation symbol sum sequence is detected and a piece of guard interval information is generated according to the energy interval distribution, wherein the guard interval information includes the ratio of the guard interval length to the data interval length.

For the situation where the transmission mode of the sample sequence is unknown or the sample sequence adopts a plurality of transmission modes, the transmission parameter recognition method includes a plurality of testing modes, which are respectively and exclusively corresponding to the plurality of transmission modes the sample sequence adopts.

Figure 10:
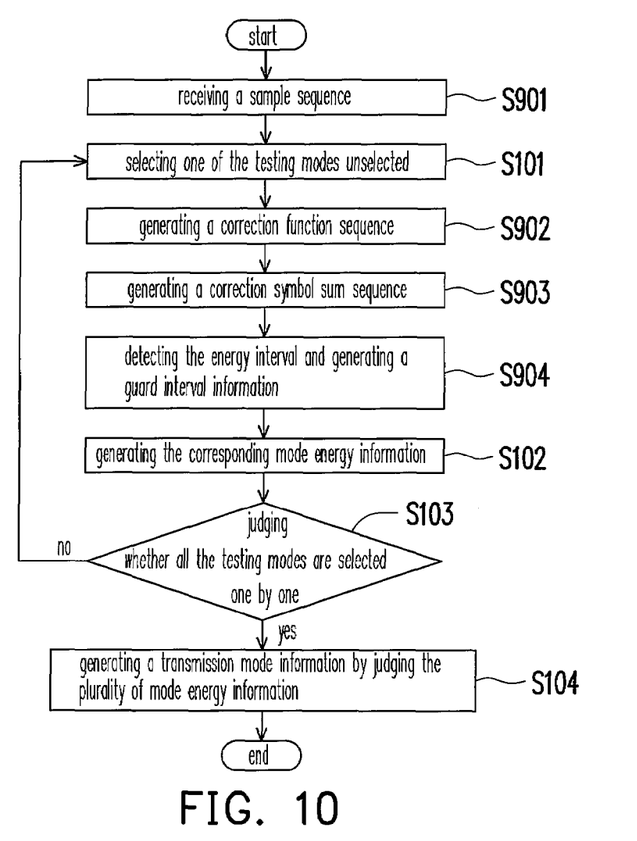
FIG. 10 is a flowchart of a transmission parameter recognition method according to another preferred embodiment of the present invention.

For the above-mentioned situations, the flowchart of the transmission parameter recognition method is shown by FIG. 10. After receiving a sample sequence (step S901), one of the plurality of testing modes is selected as the active testing mode by the transmission parameter recognition method (step S101). Then, a piece of mode energy information corresponding to each testing mode is generated according to the guard interval information (step S102).

In order to obtain a piece of mode energy information corresponding to each testing mode, in step S103 after step S102, it is judged whether all the testing modes are selected one by one. If not all the testing modes are selected, one is selected from the testing modes unselected (step S101); if all the testing modes have been selected one by one, a piece of transmission mode information is generated by judging the plurality of mode energy information for obtaining the transmission mode of the sample sequence (step S104). Other details of the method are described in the above embodiments and therefore the description is not repeated.

It is noted that the transmission parameter recognition apparatus and the above-described transmission parameter recognition method provided by the embodiments are suitable for an OFDM receiver.

In summary, the present invention employs a correlation symbol summing module to generate an energy interval, wherein the distribution of the energy interval is related to the guard interval type of the sample sequence. Therefore, once the energy interval detection module has revealed the distribution of the energy interval, the guard interval type of the sample sequence can be identified. In comparison with the prior art, the present invention is capable of effectively simplifying the complexity of the hardware architecture and lowering the power consumption.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transmission parameter recognition apparatus, used for detecting a sample sequence and outputting a piece of guard interval information, wherein the sample sequence comprises a plurality of symbols and each of the symbols comprises a guard interval and a data interval, the transmission parameter recognition apparatus comprising:

a correlation function processing module, for performing a conjugating and multiplying calculation on two adjacent symbols from the sample sequence to generate a conjugate product sequence, and accumulating these values corresponding to a sample point and MNg sample points in the conjugate product sequence to generate a value of a correlation sample point, wherein the MNg sample points are prior to the sample point, a plurality of the correlation sample points form a correlation symbol, a plurality of the correlation symbols form a correlation function sequence and MNg is a least length of the guard interval in a testing mode;

a correlation symbol summing module, coupled to the correlation function processing module, for providing a first sample memory point to an (MNk+MNu)-th sample memory point, and using the sample memory points for sequentially reading and summing up the values corresponding to the correlation sample points in M correlation symbols of the plurality of the correlation symbols to generate a correlation symbol sum sequence, wherein an i-th sample memory point is adopted for reading and summing up a value of an [N*(MNk+MNu)+i]-th correlation sample point, MNu is a length of the data interval in the testing mode, MNk is equal to MNg plus a predetermined value, M is an integer, $0 \leq N \leq M$ and $1 \leq i \leq (MNk+MNu)$; and an energy interval detection module, coupled to the correlation symbol summing module, for detecting an energy interval of the correlation symbol sum sequence and generating the guard interval information according to the energy interval, wherein the guard interval information comprises a ratio of the guard interval length to the data interval length.

2. The transmission parameter recognition apparatus according to claim 1, wherein the transmission parameter recognition apparatus comprises a plurality of testing modes, the sample sequence is passed through the correlation function processing module and the correlation symbol summing module of the testing modes, so that the energy interval detection module is able to generate a plurality of mode energy information respectively, and the transmission parameter recognition apparatus further comprises:

a transmission mode recognition apparatus, coupled to the energy interval detection module, for judging the plurality of mode energy information to output a piece of transmission mode information so as to obtaining the transmission mode of the sample sequence.

3. The transmission parameter recognition apparatus according to claim 2, wherein the testing modes comprise "2K" mode and "8K" mode.

4. The transmission parameter recognition apparatus according to claim 1, wherein the correlation function processing module comprises:

a delayer, for receiving the sample sequence and delaying the sample sequence with MNu sample points so as to output a delayed sample sequence;

a complex conjugation processor, for receiving the sample sequence and calculating a complex conjugate of the sample sequence so as to obtain a complex conjugated sample sequence;

a multiplier, coupled to the delayer and the complex conjugation processor, for multiplying the delayed sample sequence by the complex conjugated sample sequence so as to generate the conjugate product sequence; and an adder, coupled to the multiplier, for accumulating these values corresponding to the sample point and MNg sample points in the conjugate product sequence so as to generate the value of the correlation sample point, wherein these MNg sample points are prior to the sample point.

5. The transmission parameter recognition apparatus according to claim 1, wherein the energy interval detection module comprises:

a first rising-edge detector, for detecting the rising-edge of the energy interval to output a first time point;

an energy accumulator, coupled to the rising-edge detector, for taking the first time point as an initiative point and performing calculations and summations on the values of the energy interval over a plurality of time points so as to generate a plurality of energy information respectively; and a guard interval recognition apparatus, coupled to the energy accumulator, for judging the plurality of energy information so as to generate the guard interval information.

6. The transmission parameter recognition apparatus according to claim 5, wherein the time points comprise the first time point and more, up to the i-th time point, wherein i is an integer greater than 1.

7. The transmission parameter recognition apparatus according to claim 1, wherein the correlation symbol summing module comprises:

a second rising-edge detector, for detecting an initiative point of the 1-st correlation symbol in the correlation function sequence.

8. The transmission parameter recognition apparatus according to claim 1, wherein the ratio is 1/32, 1/16, 1/8 or 1/4.

9. The transmission parameter recognition apparatus according to claim 1, suitable for an OFDM receiver.

10. A transmission parameter recognition method, comprising the following steps:

receiving a sample sequence, wherein the sample sequence comprises a plurality of symbols and each of the symbols comprises a guard interval and a data interval;

performing a conjugating, delaying and multiplying calculation on two adjacent symbols from the sample sequence to generate a conjugated product sequence, and accumulating these values corresponding to a sample point and MNg sample points in the conjugate product sequence so as to generate a value of a correlation sample point, wherein the MNg sample points are prior to the sample point, a plurality of the correlation sample points form a correlation symbol, a plurality of the correlation symbols form a correlation function sequence and MNg is a least length of the guard interval in a testing mode;

providing a plurality of sample memory points, from a first sample memory point to an (MNk+MNu)-th sample memory point, and using the sample memory points to sequentially read and sum up the values corresponding to the correlation sample points from M correlation symbols of the plurality of the correlation symbols so as to generate a correlation symbol sum sequence, wherein an i-th sample memory point is adopted for reading and summing a value of an [N*(MNk+MNu)+i]-th correlation sample point, wherein MNu is a length of the data interval in the testing mode, MNk is equal to MNg plus a predetermined value, M is an integer, $0 \leqq N \leqq M$ and $1 \leqq i \leqq (MNk+MNu)$; and detecting an energy interval of the correlation symbol sum sequence and generating the guard interval information according to the energy interval, wherein the guard interval information includes a ratio of the guard interval length to the data interval length.

11. The transmission parameter recognition method according to claim 10, comprising a plurality of testing modes, and the transmission parameter recognition method further comprising:

selecting one of the plurality of testing modes;

generating a piece of corresponding mode energy information according to the guard interval information; and judging whether all the testing modes are selected one by one, wherein if not all the testing modes are selected, select one of the testing modes unselected, otherwise, a piece of transmission mode information is generated by judging the plurality of mode energy information for obtaining the transmission mode of the sample sequence.

12. The transmission parameter recognition method according to claim 10, wherein the step of performing a conjugating, delaying and multiplying calculation on said two adjacent symbols from the sample sequence to generate a product sequence of delayed sample and conjugated sample comprises:

delaying the sample sequence with MNu sample points to generate a delayed sample sequence;

calculating a complex conjugate of the sample sequence to obtain a complex conjugated sample sequence; and multiplying the delayed sample sequence by the complex conjugated sample sequence to generate the conjugate product sequence.

13. The transmission parameter recognition method according to claim 10, wherein the step for generating the guard interval information according to the energy interval comprises:

detecting the rising-edge of the energy interval to generate a first time point;

taking the first time point as the initiative point in order to perform calculations and summations on the values of an energy interval over a plurality of time points so as to generate a plurality of energy information; and judging the plurality of energy information to generate the guard interval information.

14. The transmission parameter recognition method according to claim 13, wherein the time points comprise the first time point and up to the i-th time point, wherein i is an integer greater than 1.

15. The trans mission parameter recognition method according to claim 10, further comprising:
   detecting an initiative point of each of the correlation symbols from the correlation function sequence.

16. The transmission parameter recognition method according to claim 10, wherein the ratio is 1/32, 1/16, 1/8 or 1/4.

17. The transmission parameter recognition method according to claim 10, wherein the testing modes comprise "2K" mode and "8K" mode.

18. The transmission parameter recognition method according to claim 10 is suitable for an OFDM receiver.

* * * * *